Oct. 28, 1924.
H. CORY ET AL
FRICTION LINING
Filed May 11, 1922
1,513,492
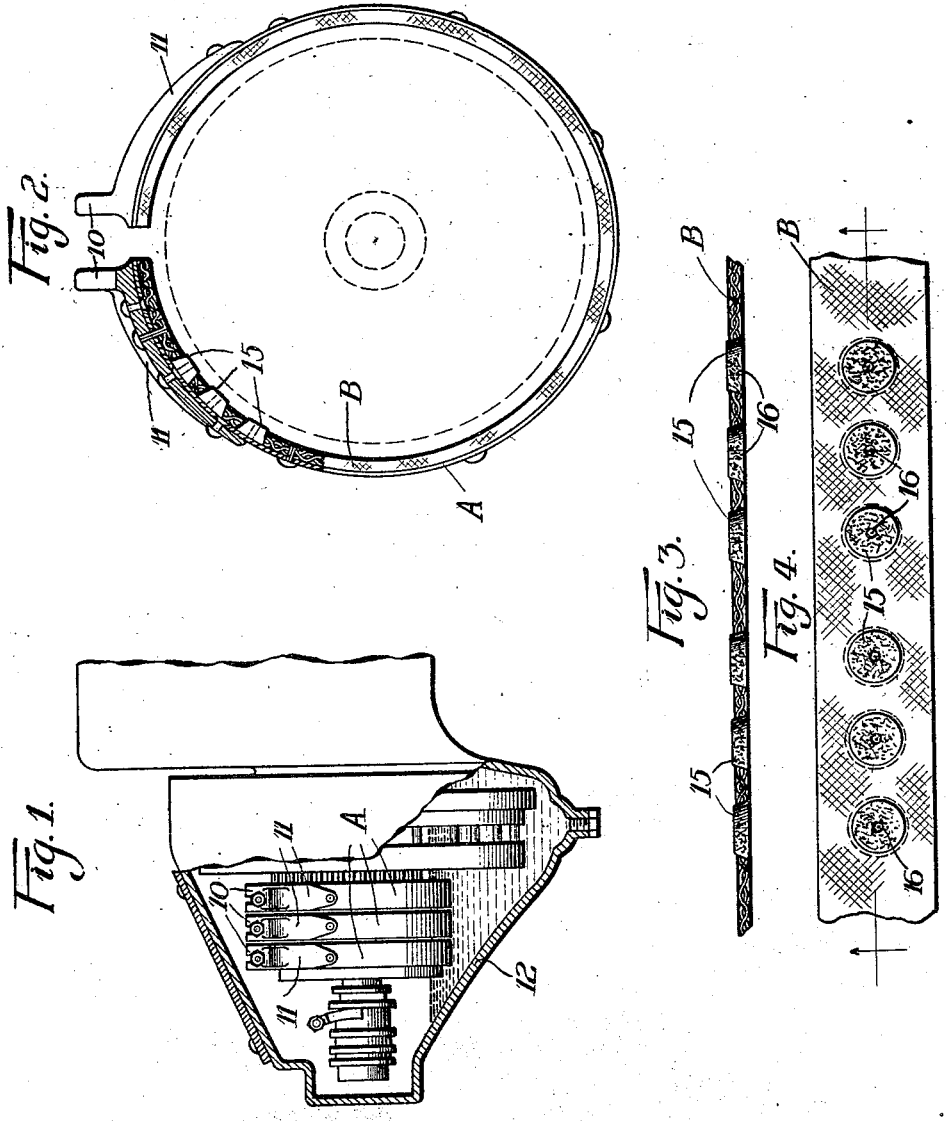
Inventors:
Harvey Cory.
Orrin D. Gray.
by [signature] Atty's Patented Oct. 28, 1924.

UNITED STATES PATENT OFFICE.

1,513,492

HARVEY CORY AND ORRIN D. GRAY, OF CHICAGO, ILLINOIS; SAID GRAY ASSIGNOR OF HIS ENTIRE RIGHT TO ADVANCE AUTOMOBILE ACCESSORIES CORPORATION, OF CHICAGO, ILLINOIS, A CORPORATION OF DELAWARE.

FRICTION LINING.

Application filed May 11, 1922. Serial No. 560,018.

*To all whom it may concern:*

Be it known that we, HARVEY CORY and ORRIN D. GRAY, both citizens of the United States, residing at Chicago, in the county of Cook and State of Illinois, have invented certain new and useful Improvements in Friction Linings, of which the following is a specification.

This invention relates to a friction lining such as is particularly adapted for use with clutches, transmissions, brakes, etc. As illustrative of one use to which the invention may be put, the description to follow, as well as the drawings therein referred to, has particular reference to a planetary transmission such as is commonly used in present-day automobiles.

According to present practice, a lining, usually in the form of a fabric strip, is secured to the inner face of a flexible band which is adapted to be tightened about a revolving drum, thereby applying a desired degree of friction so as to check gently the speed of the drum or to hold it against rotation. The drum, together with its associated parts, may be housed within a suitable casing that contains an oil reservoir so that all the parts are required to operate in a bath or spray of oil. The lining which is generally used to obtain proper frictional effects, will in these circumstances give satisfactory service for a considerable period of time, but ultimately will become burned or charred on its friction face, owing to the heat that is generated in use. Because of the close weave of the fabric composing the lining, its body is practically impervious to the passage of oil; in consequence oil within the reservoir is unable to permeate through the fibres of the lining sufficiently to afford proper lubrication, so that it is eventually burned and charred, and its friction face becomes both glazed and hardened.

The frictional material at present used for linings is rather compact and unyielding, and so is incapable of being materially compressed. Furthermore, after some use this frictional material loses practically all of its resiliency—in most cases becoming very hard. The ideal frictional lining for a brake or a clutch should possess a considerable degree of resiliency, and should maintain this resiliency throughout its lifetime, because the smoothness with which the clutch or brake takes hold depends upon the softness of the initial contact of the frictional members. Consequently, a frictional material which would combine strength and great resiliency, as well as a high co-efficient of friction, would be a perfect brake or clutch lining.

With a view of avoiding certain of the difficulties just mentioned, we have aimed in this invention to produce an improved lining which is provided with compressible inserts, and with means for lubricating the bearing surfaces thereof, so that the performance of the lining in service is vastly improved, and its life considerably prolonged.

In the embodiment of this invention, a preferred form is shown in the accompanying drawing in the manner following:

Figure 1 is a transverse section through a housing containing a planetary transmission, the view exhibiting an oil reservoir as well as three bands each of which is lined on its inner surface with a friction lining;

Fig. 2 is an elevation of an edge of one band detached from its associated mechanism, a lining being shown upon its inner face; a portion of this figure is also broken away to better exhibit the parts in longitudinal section; and Figs. 3 and 4 represent, respectively, a longitudinal section and plan view of a lining which embodies our invention.

Referring now particularly to Figs. 1 and 2, the lining may be applied to a clutch in which is included a band A in the form of a split ring to the ends of which are secured upstanding slotted lugs 10 each equipped with a foot 11 bolted or otherwise made fast to the band. These parts of the band are intended to co-operate with other elements (not shown) which act to tighten the band against a drum or the like when friction is to be applied thereto. To the inner side of the band is secured a friction lining which is attached to the band by any suitable means, such as rivets, as shown. The split band best shown in Fig. 2 may be arranged operatively with respect to a clutch, brake, or the like, and its associated parts, the entire mechanism being housed within a casing 12, as illustrated in Fig. 1, wherein is provided a reservoir for oil, the level of which is kept at the desired point. When the mechanism is in operation certain of the parts are revolved through the oil so as to have the effect of carrying the oil up in the form of a sheet around the sides of the casing by which action the entire mechanism is treated to a bath or spray of oil. In this manner the oil reaches practically all parts of the mechanism, except upon the inner face of the lining where the maximum friction obtains, and where burning or charring is most likely to occur.

According to this invention the friction lining B is formed of a suitable material such as cotton fabric which may be treated with pitches, stearines, oils, or otherwise, to impart thereto additional strength, toughness, wearability and a higher coefficient of friction. Such a treatment, furthermore, tends further to reduce the absorptiveness of the lining so that oil is unable to penetrate its body to any considerable extent. In the lining of this character we provide a plurality of openings in each of which is contained an insert 15 of cork or other desirable material. By preference the sides of these inserts are tapered so as to be capable of insertion or withdrawal from the lining on one side only. In practice the larger ends of the inserts lie adjacent the band to which the fabric is secured by any appropriate means so that the inserts are maintained securely against displacement.

The use of cork as a desirable material for the inserts is suggested because of its frictional properties, and also because of its compressibility. The present inserts when backed against the band are sufficiently long to protrude slightly beyond the face of the lining, thereby imparting the initial friction to the revolving drum. As the band is tightened thereupon with a consequent increase of pressure, the inserts of cork are compressed and recede sufficiently to permit the lining itself to bear against the drum to add its friction thereto.

In service the heat generated by the friction of the lining upon the drum tends to burn or char the face of the inserts, with the result that their bearing faces become glazed and hardened. This, of course, impairs the frictional qualities of the inserts, and is a condition to be avoided, if possible. The oil contained within the housing wherein the drums are revolved is carried around to afford partial lubrication to the inserts, but ordinarily such lubrication is found to be insufficient. Owing to the manner in which a friction lining is woven and treated, it is impossible to pass oil through the body thereof to lubricate the bearing faces of the inserts. According to this invention, however, small reservoirs are provided on the friction face of the lining, and these may each take the form of an aperture 16 extending from the rear to the front face of each insert, the aperture being of sufficient size to hold an appreciable amount of oil. A plentiful supply of oil is usually available at the rear of a friction lining such as is here described, and the principal problem is to provide for getting some of that oil to the front face thereof. This may be accomplished, as suggested by the provision of small reservoirs in the form of holes, pockets, or openings, each capable of retaining a slight amount of oil. With tightening of the band upon the drum, the inserts are compressed with the result that some of the oil so contained within the reservoirs therein is expressed therefrom upon the bearing face of the inserts to oppose burning or charring thereof. In addition, the oil is fed to the friction surfaces through the action of the revolving drum passing over the face of the lining—there being a tendency resulting therefrom to draw the oil from the reservoirs between the friction surfaces.

From the preceding description it will be noted that this invention is concerned with a friction lining of fabric or other suitable material wherein are contained inserts for enhancing the frictional effect; and with such a lining the provision of means by which adequate lubrication is maintained between the moving parts so as to reduce or eliminate burning or charring both of the lining and its inserts. The embodiment of our invention contained in the accompanying drawing is entirely satisfactory for the accomplishment of the ends set forth, but obviously may be modified within the limits imposed by the appended claims without departing from the underlying principles thereof.

We claim:

1. A lining of the kind described formed of material relatively impervious to oil in combination with friction inserts therein each having in its body an opening through which oil may pass from one side of the lining to the other, substantially as described.

2. A lining of the kind described formed of material relatively impervious to oil in combination with compressible friction inserts therein each formed with an oil pocket opening onto its bearing face such that lubrication is imparted thereto when the insert is compressed, substantially as described.

3. A lining of the kind described formed of relatively non-compressible material in combination with compressible frictional inserts extending therethrough from one face to the other, there being openings also passing through from one lining face to the other adapted to be reduced in size when the inserts are compressed whereby oil contained in such openings is expressed therefrom, substantially as described.

HARVEY CORY.
O. D. GRAY.

Witness:
Ephraim Banning.